US007209664B1

(12) United States Patent
McNicol et al.

(10) Patent No.: US 7,209,664 B1
(45) Date of Patent: Apr. 24, 2007

(54) FREQUENCY AGILE TRANSMITTER AND RECEIVER ARCHITECTURE FOR DWDM SYSTEMS

(75) Inventors: John D. McNicol, Ottawa (CA); Kuang Tsan T. Wu, Kanata (CA); Adrien A. Comeau, Nepean (CA)

(73) Assignee: Nortel Networks Limited, St. Laurent, QC (CA)

( * ) Notice: Subject to any disclaimer, the term of this patent is extended or adjusted under 35 U.S.C. 154(b) by 656 days.

(21) Appl. No.: 10/457,527

(22) Filed: Jun. 10, 2003

(51) Int. Cl.
*H04B 10/00* (2006.01)
*H04B 10/06* (2006.01)
(52) U.S. Cl. ............... 398/135; 398/203; 398/204; 398/163; 398/13; 398/137; 398/167.5; 398/162; 375/219
(58) Field of Classification Search .......... 398/135, 398/203–204, 163, 13, 137, 167.5, 162; 375/219
See application file for complete search history.

(56) References Cited

U.S. PATENT DOCUMENTS

| 5,101,450 | A | * | 3/1992 | Olshansky | ............ | 385/3 |
| 5,301,053 | A | * | 4/1994 | Shikada | ............ | 398/72 |
| 5,822,373 | A | * | 10/1998 | Addy | ............ | 375/259 |
| 6,178,314 | B1 | * | 1/2001 | Whikehart et al. | ...... | 455/188.1 |
| 6,970,717 | B2 | * | 11/2005 | Behrens et al. | ......... | 455/553.1 |
| 2004/0114939 | A1 | | 6/2004 | Taylor | | |

OTHER PUBLICATIONS

B. Glance, "Polarization Independent Coherent Optical Receiver", Journal of Lightwave Technology. vol. LT-5, No. 2, Feb. 1987.
Erik De Man, et al., A 60-MBaud Single-Chip QAM Processor for the complete Base-band Signal Processing of QAM Demodulators, Seimans A.G., Corporate Research and Development, Munich, Germany, pp. 275-276.
Optical QPSK Transmission System with Novel Digital Receiver Concept, Electronic Letters, Nov. 7, 1991, vol. 27, No. 23., pp. 2177-2179.
Frowin Derr, Coherent Optical QPSK Intradyne System: Concept and Digital Receiver Realization, Journal of Lightwave Technology, vol. 10, No. 9, Sep. 1992, pp. 1290-1296.
Katsushi Iwashita, et al., Chromatic Dispersion Compensation in Coherent Optical Communications, Journal of Lightwave Technology, vol. 8, No, 3, Mar. 1990, pp. 367-375.

(Continued)

*Primary Examiner*—Jason Chan
*Assistant Examiner*—Danny Wai Lun Leung
(74) *Attorney, Agent, or Firm*—Kent Daniels; Ogilvy Renault LLP

(57) ABSTRACT

A frequency-agile optical transceiver includes a shared local oscillator (LO), a coherent optical receiver and an optical transmitter. The LO operates to generate a respective LO optical signal having a predetermined LO wavelength. The coherent optical receiver is operatively coupled to the LO, and uses the LO signal to selectively receive traffic of an arbitrary target channel of an inbound broadband optical signal. The optical transmitter is also operatively coupled to the LO, and uses the LO to generate an outbound optical channel signal having a respective outbound channel wavelength corresponding to the LO wavelength.

17 Claims, 9 Drawing Sheets

OTHER PUBLICATIONS

Chris Cho-Pin Li, et al., Comparison of Coded and Uncoded QPSK Intradyne and Heterodyne Receivers, IEEE, 1993 pp. 1891-1895.
Isaac Shpantzer, A New Generation of Coherent ULH Fiber-Optic Communication, 40 G Workshop, OECC-2002 Conference, Yokohama, Japan, pp. 1-14.
Isaac Shpantzer, et al., Coherent Optical Fiber Communication Architecture, Modeling and Optimization, SCE 2002 Conference, Eindhoven, The Netherlands, pp. 1-39.
M. Tseytlin, et al., Digital, Endless Polarization Control for Polarization Multiplexed Fiber-Optic Communications OFC 2003, pp. 1-14.
Takashi Ono, et al., Polarization Control Method for Suppressing Polarization Mode Dispersion Influence in Optical Transmission Systems, Journal of Lightwave Technology, vol. 12, No. 5, May 1994, pp. 891-898.
G. Sebald, et al., A Single Chip Adaptive QAM Processor for Data Rates up to 500 MBIT/S, Radio Relay Systems, Oct. 11-14, 1993, IEE, pp. 227-233.
G. Sebald, et al., Advanced Time- and Frequency-Domain Adaptive Equalization in Multilevel QAM Digital Radio Systems, IEEE Journal on Selected Areas in Communications, vol. Sac-5. No. 3, Apr. 1997, pp. 448-456.

* cited by examiner

BP Filter Response

Cumulative Response

LP Filter Response

Cumulative Response

FREQUENCY AGILE TRANSMITTER AND RECEIVER ARCHITECTURE FOR DWDM SYSTEMS

CROSS-REFERENCE TO RELATED APPLICATIONS

This is the first application filed for the present invention.

MICROFICHE APPENDIX

Not Applicable.

TECHNICAL FIELD

The present invention relates to optical communications systems, and in particular to a frequency agile transmitter and receiver architecture for Dense Wavelength Division Multiplexed (DWDM) communications systems.

BACKGROUND OF THE INVENTION

Optical communications networks are becoming increasingly popular for data transmission due to their high bandwidth capacity. Typically, a bit-stream is encoded (e.g., using On-Off-Keying—OOK) to generate sequential symbols that are conveyed through a communications channel by a respective optical channel signal. In most cases, the optical channel signal is generated by a narrow-band optical source (e.g., a narrow-band laser) tuned to a desired channel wavelength. At a receiving end of the communications channel, an optical receiver detects and decodes the symbols of the optical channel signal to recover the original bit-stream. Typically, the receiver is composed of an optical detector followed by electrical signal processing circuitry. The optical detector converts the incoming optical channel signal into a corresponding electrical channel signal. The electrical signal processing circuitry (e.g., Analog-to-Digital (A/D) converter, digital filter, equalizer, Forward Error Correction circuits, etc.) decode the symbols within the electrical channel signal to recover the bit-stream.

In Wavelength-Division Multiplexed (WDM) and Dense Wavelength-Division Multiplexed (DWDM) optical systems, multiple optical channel signals, each of which has a respective different channel wavelength, are multiplexed into a broadband optical signal which is launched through an optical fiber. In order to recover any given bit-stream, the corresponding optical channel signal must be demultiplexed from the broadband optical signal and directed to a receiver for detection and data recovery.

Conventional optical demultiplexers utilize a cascade of wavelength-selective filters, such as Array Waveguide (AWG) or Fiber Bragg Grating (FBG) filters. Each filter operates to extract light within a narrow band centered about a predetermined filter wavelength, which is chosen to correspond to a specific channel wavelength. Filter-based demultiplexers suffer a disadvantage that their design is tightly related to the channel plan of the communications network. Consequently, the channel plan of the system cannot be changed without also replacing every involved optical demultiplexer in the network.

The publication "Polarization Independent Coherent Optical Receiver", by B. Glance, Journal of Lightwave Technology, Vol. LT-5, No. 2, February 1987, proposes a coherent optical receiver for detecting data traffic encoded within an optical signal. Theoretical considerations relating to the performance and behavior of coherent optical receivers are presented in "Performance of Coherent Optical Receivers", by John R. Barry and Edward A Lee, Proceedings of the IEEE, Vol. 79, No. 8, August 1990 and "Fiber-Optic Communications Systems"$2^{nd}$ ed. Govind P. Agrawal, John Wiley & Sons, New York, 1997, ISBN 0-471-17540-4, Chapter 6. In general, an optical local oscillator (LO) signal is added to a received optical signal, and the combined lightwave is directed towards a photodetector. The current produced by the photodetector includes an Intermediate Frequency (IF) signal that is centered at an IF equal to the difference between the LO and optical signal frequencies, usually in the microwave (GHz) range, where well established electrical signal processing techniques can be employed to detect and decode the data traffic.

In principle, coherent optical receivers of this type offer the possibility of receiving broadband optical signals without suffering the limitations of conventional filter-based demultiplexing methods. For example, the LO may be tuned to translate any desired optical channel frequency to a predetermined IF to facilitate carrier detection and data recovery, in a manner directly analogous to radio frequency homodyne, heterodyne and super-heterodyne receivers. With this arrangement, changes in the channel plan of the network (in terms of the number of channels and the specific channel wavelengths used) may be accommodated "on the fly" by changing the LO signal wavelength, rather than the receiver equipment itself.

Another expected benefit of coherent receivers is based on their extremely narrow-band data detection performance. In particular, electrical signal filtering of the IF signal typically provides strong attenuation of signal components lying outside of a very narrow frequency band about the predetermined IF, which should enable the receiver to discriminate between closely spaced wavelength channels of a received broadband optical signal.

However, coherent optical receivers suffer a limitation in that their narrow-band performance renders them highly sensitive to carrier offset and phase noise. In fact, optimal data recovery is obtained only when the channel frequency (in the IF signal) exactly corresponds with the predetermined IF. As the channel frequency shifts away from this predetermined value (i.e., as the carrier offset increases), data recovery performance degrades rapidly. Phase noise in either the LO or received optical signals appears as noise in the IF signal, and degrades receiver performance. In order to avoid this problem, and thereby enable satisfactory data recovery, very low noise laser sources (for both the transmitter and the receiver local oscillator) and microwave phase-locked loops are required. This requirement dramatically increases the cost of both transmitters and receivers. As a result, coherent optical receivers are not commonly utilized in modern optical communications networks.

Accordingly, a cost-effective frequency-agile optical transceiver remains highly desirable.

SUMMARY OF THE INVENTION

An object of the invention is to provide a frequency-agile optical transceiver for a broadband optical communications system.

Accordingly, an aspect of the present invention provides a frequency-agile optical transceiver, including a shared local oscillator (LO), a coherent optical receiver and an optical transmitter. The LO operates to generate a respective LO optical signal having a predetermined LO wavelength. The coherent optical receiver is operatively coupled to the LO, and uses the LO signal to selectively receive traffic of an arbitrary target channel of an inbound broadband optical signal. The optical transmitter is also operatively coupled to the LO, and uses the LO to generate an outbound optical channel signal having a respective outbound channel wavelength corresponding to the LO wavelength.

Thus the present invention provides a frequency-agile optical transceiver in which a common LO is used for both reception and transmission functions. In embodiments in which homodyne carrier detection is used in the coherent optical receiver, the received channel and the generated outbound channel will have substantially the same wavelength (frequency). In other embodiments, the received channel and the generated outbound channel will be frequency-shifted relative to each other.

In a two-way optical transmission system, one node can be nominally designated as a "master", and the other node designated as a "slave". The LO of the slave node can be controlled by a tuning signal derived at the master node, such that the frequency difference between the two LO's approaches 0 Hz in homodyne detection or a specified frequency difference in heterodyne detection.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
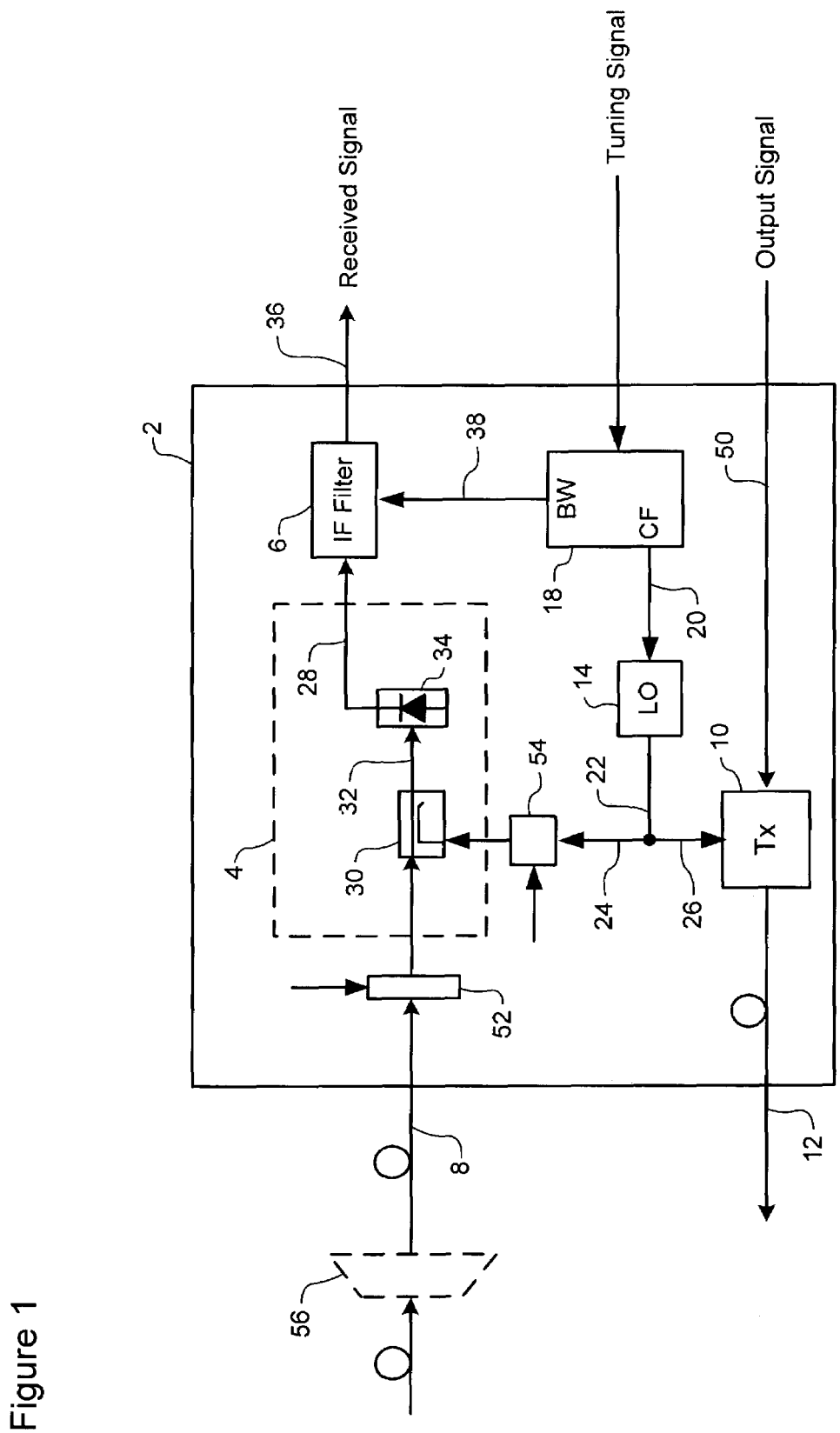
FIG. 1 is a block diagram schematically illustrating principal elements of a frequency agile optical transceiver in accordance with a first embodiment of the present invention.

The present invention provides a frequency agile optical transceiver for transmitting and receiving data traffic through an arbitrary channel of a broadband optical signal. FIG. 1 is a block diagram schematically illustrating principal elements of a frequency agile optical transceiver in accordance with a first embodiment of the present invention.

As shown in FIG. 1, a frequency agile optical transceiver 2 in accordance with the present invention generally comprises a coherent optical receiver 4 cascaded with a controllable IF filter 6 for selectively receiving traffic of a desired "target" wavelength channel of an inbound broadband optical signal 8; an optical transmitter 10 for generating an outbound optical channel signal 12 for transmission; a shared local oscillator (LO) 14 for supplying a local oscillator optical signal 22 to both the coherent optical receiver 4 and the optical transmitter 10; and a controller 18 for controlling performance of both the controllable IF filter 6 and the LO 14.

The local oscillator (LO) 14 is preferably provided as a tunable narrow band laser, which operates in response to an LO control signal 20 produced by the controller 18 to generate a local oscillator optical signal 22 having a predetermined LO wavelength. The LO optical signal 22 is split into an Rx and a Tx LO signal paths 24 and 26. The Rx LO signal path 24 is coupled to the coherent optical receiver 4 to facilitate carrier detection of the target channel within the inbound broadband optical signal 8. The Tx LO signal path 26 is coupled to the transmitter 10 and modulated to generate the outbound optical channel signal 12.

The coherent optical receiver 4 operates to generate an Intermediate Frequency (IF) signal 28, in which signal components of the target channel are centered about a predetermined IF frequency. Thus the coherent optical receiver 4 includes an optical coupler 30 (e.g., a conventional 3 dB coupler) for combining the Rx LO optical signal 24 and the inbound broadband optical signal 8. The combined lightwave 32 emerging from the coupler 30 is then directed to a photodetector 34 (e.g., a conventional PIN photodiode), which generates an electrical Intermediate Frequency (IF) signal 28 containing a frequency shifted replica of the received broadband optical signal 8. The controllable IF filter 6 operates to isolate signal components of the target channel within the IF signal 28, to generate a corresponding received signal 36 for clock and data recovery (not shown).

The controllable IF filter 6 can be implemented in various ways, depending on the format of the inbound broadband optical signal 8, and the capabilities of downstream clock and data recovery circuitry (not shown). For example, in embodiments in which the inbound broadband optical signal 8 is formatted with uniform channel bandwidths (such as, for example, the International Telecommunications Union (ITU) 50 GHz grid), the filter 6 may be provided with a fixed filter characteristic having a predetermined center frequency, and a bandwidth that is selected to encompass the signal components corresponding to a single wavelength channel within the IF signal 28. In other cases, the filter 6 may be provided with a variable filter characteristic, in which the center frequency and/or bandwidth may be adjusted, for example in response to a filter control signal 38 generated by controller 18.

Figure 2A:
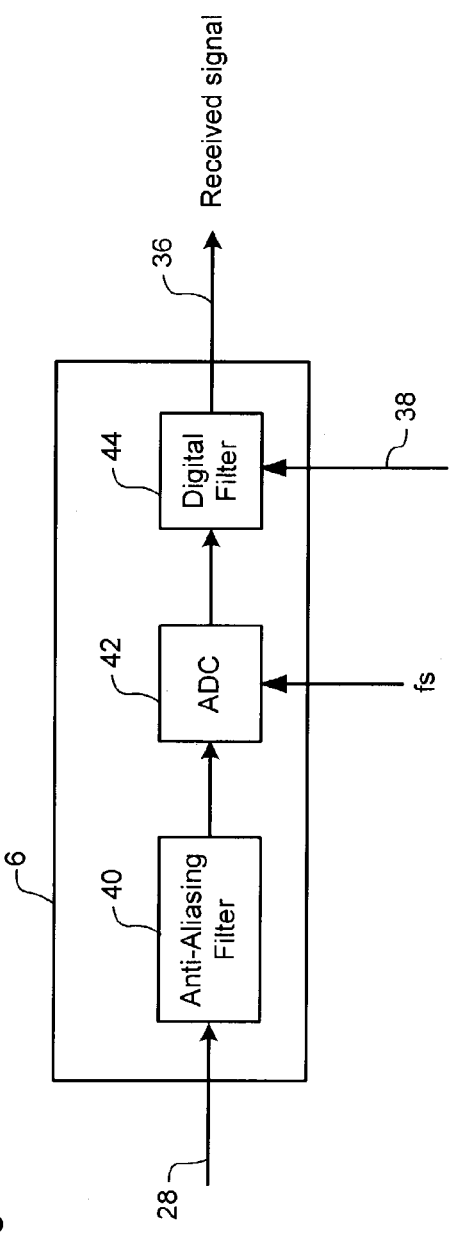
FIGS. 2a–b is a block diagram schematically illustrating principal elements of a controllable filter usable in embodiments of the present invention.

FIG. 2a is a block diagram schematically illustrating principal elements of a controllable IF filter 6 usable in the present invention. As shown in FIG. 2a, the controllable IF filter 6 is provided as an analog anti-aliasing filter 40, an analog-to-digital converter (ADC) 42, and a digital filter 44. In this case, the sampling rate (fs) of the ADC 42, and the bandwidth of the anti-aliasing filter 40 are selected to satisfy the Nyquist sampling theorem for signal components corresponding to the target wavelength channel within the IF signal 28. In some embodiments, this may be accomplished by selecting the sampling rate (fs) and the bandwidth of the anti-aliasing filter 40 to satisfy the Nyquist sampling theorem for the expected widest bandwidth channel to be received by the transceiver 2. The bandwidth of the IF filter 6 is controlled by selecting and/or programming the filter characteristic of the digital filter 44, in a manner well known in the art. The IF filter 6 of FIG. 2a is particularly suitable for embodiments of the invention in which homodyne detection is used (as described in detail below), because the required low-pass filer characteristics required to isolate traffic of any desired wavelength channel simplifies the design requirements of the anti-aliasing filter 40 and the ADC 42.

Figure 2B:
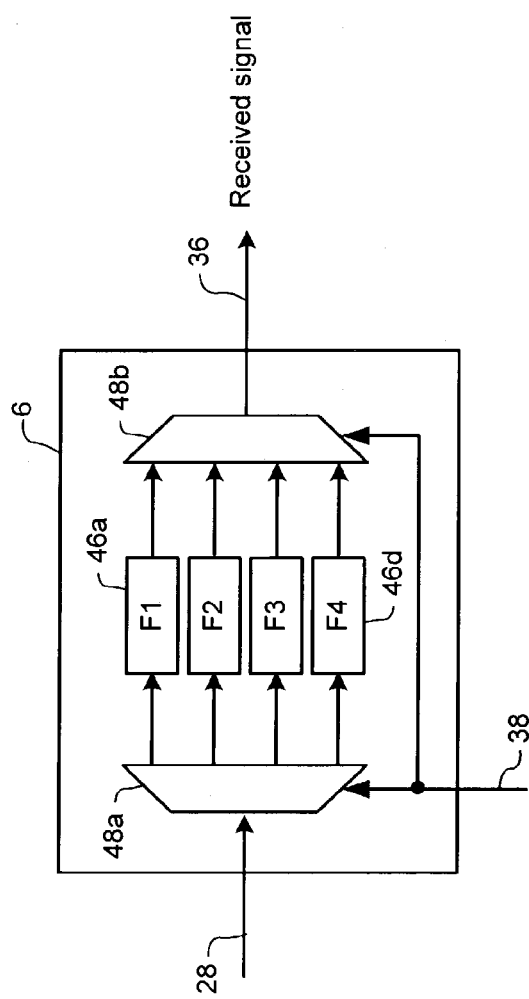

FIG. 2b is a block diagram schematically illustrating principal elements of an alternative controllable IF filter 6 usable in the present invention. As shown in FIG. 2b, the controllable IF filter 6 is provided as a set of two or more parallel analog filter blocks 46 coupled between a pair of switch circuits 48. In the illustrated embodiment, four filter blocks 46 are provided, although more, or fewer filter blocks may be used, as desired. Each filter block 46 is designed as a conventional analog filter network having a respective predetermined filter characteristic. The filter characteristic of each filter block 46 can be designed to suit the requirements of an expected channel IF and bandwidth within the IF signal 28. For example, in the case of homodyne detection, the filter blocks 46 can all be provided as low-pass filters, each having a respective different cut-off frequency fc. In the case of heterodyne detection, the filter blocks 46 can all be provided as band-pass filters, each having a common center frequency (corresponding to the expected channel IF) and a respective different pass band width. In both cases, a wavelength channel of virtually any bandwidth can be accommodated by the controllable IF filter 6 by selecting the filter block 46 for which the filter characteristic most closely matches the requirements of the wavelength channel, and then controlling the switch circuits 48 to route the IF signal 28 to the selected filter block 46. The IF filter 6 of FIG. 2b is particularly suitable for embodiments of the invention in which a limited number of different channel bandwidths are expected in the network.

Referring back to FIG. 1, the optical transmitter 10 operates to modulate the Tx LO optical signal 26 using an output signal 50 and thereby generate the outbound optical channel signal 12 for transmission through the network. This functionality can be accomplished using one or more optical modulators (such as Mach-Zehnder modulators) in a manner well known in the art.

If desired, a polarization controller 52 can be used to control the polarization state of the broadband optical signal 8, and thereby ensure alignment between the polarization states of the received broadband and Rx LO optical signals 8 and 24 within the optical coupler 30. In addition, a controllable phase shifter 54 may be used to ensure phase alignment between the received broadband and Rx LO optical signals 8 and 24 within the optical coupler 30. If desired, a group filter 56 may be provided to filter the inbound broadband optical signal 8, so as to reduce the total optical energy input to the photodetector 34. This can be useful to reduce optical noise and prevent saturation of the photodetector 34.

Figure 3A:
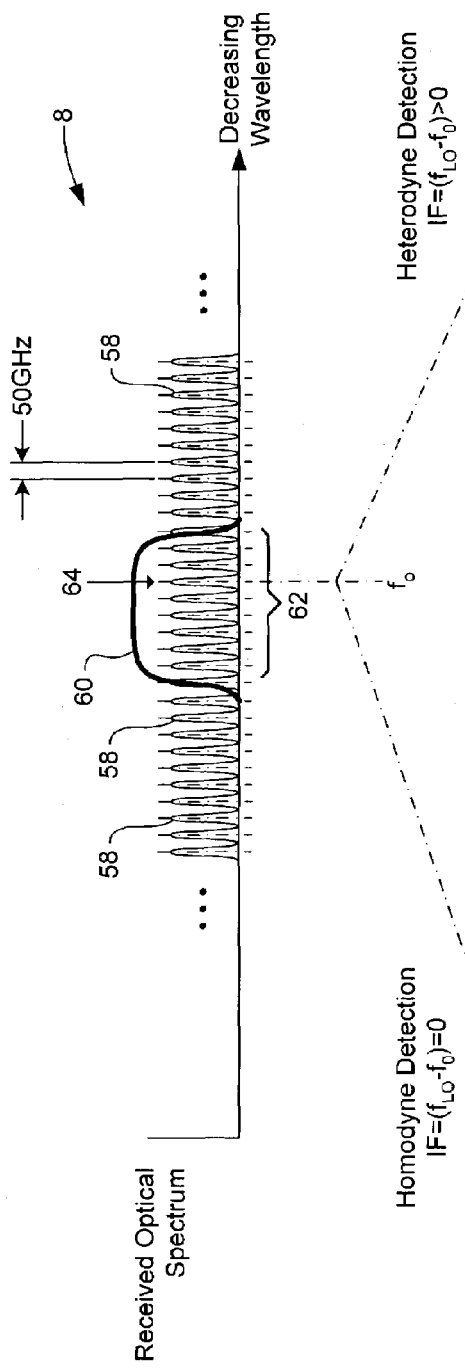
FIGS. 3a–e illustrate operation of the optical transceiver of FIG. 1 for receiving an arbitrary channel of a broadband optical signal using homodyne and heterodyne carrier detection.

FIG. 3a shows a typical optical spectrum of the inbound broadband optical signal 8. Following a conventional ITU 50 GHz grid, the broadband optical signal 8 is divided into multiple wavelength channels 58 on a 50 GHz spacing. This channel plan facilitates multiplexing and demultiplexing of individual wavelength channels 58 using conventional filter based optical multiplexing and demultiplexing techniques, and is tolerant of moderate phase noise in optical transmitter optical sources. As may be seen in FIG. 3a, the optional group filter 56 (FIG. 1) has a band-pass filter characteristic 60 that defines a channel group 62 containing the target wavelength channel 64. With this arrangement, the group filter 56 attenuates components of the inbound broadband optical signal 8 lying outside the channel group 62. Consequently, the optical energy received by the photodetector 34 is reduced to the selected channel group 62 and the Rx LO signal 24.

An important advantage of the present invention is that the transceiver 2 is capable of detecting and isolating traffic of any arbitrary wavelength channel 58 from the inbound broadband optical signal 8. The ability to receive traffic having an arbitrary center wavelength (at least within the tuning range of the local oscillator 14) is an inherent function of conventional coherent optical receivers. However, the transceiver 2 of the present invention is further capable of receiving traffic having any arbitrary channel bandwidth. This functionality is provided by the controllable IF filter 6, as will be described in greater detail below. Accordingly, while the standard ITU grid is used in conventional optical networks (and thus used for illustrative purposes in FIG. 3), a regular channel spacing is not necessary for the present invention. In fact, in networks in which the optical transceiver 2 of the present invention is utilized, any arbitrary mix of high and low bandwidth wavelength channels, and any arbitrary channel spacing, may be used.

Figure 3D:
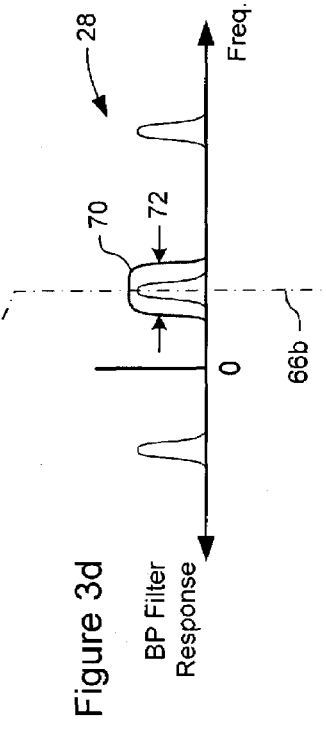
Figure 3E:
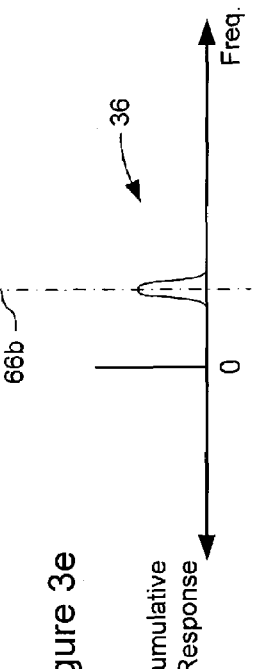
Figure 3B:
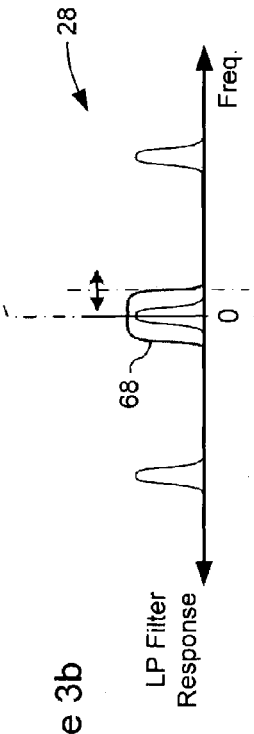
Figure 3C:
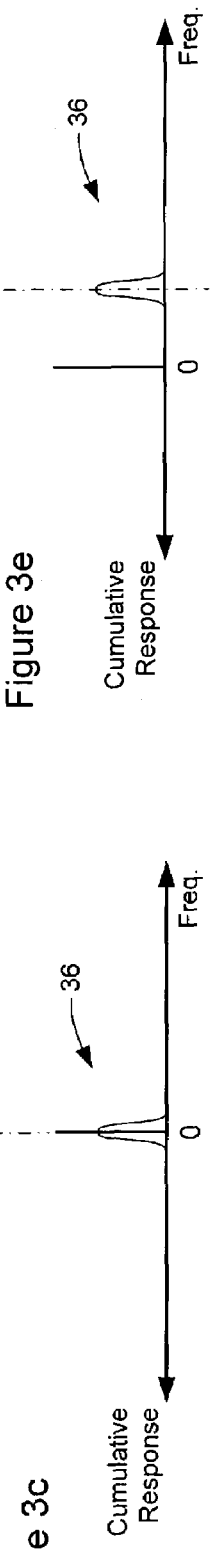

FIGS. 3b and 3c illustrate operation of the transceiver 2, when homodyne carrier detection is used. In this case, the LO 14 is tuned to match the channel wavelength of the target channel 64. As a result, signal components of the IF signal 28 corresponding to the target channel 64 will be centered about an "intermediate" frequency 66a of zero Hz. In conventional radio-communications terminology, the target channel 64 has been "downconverted" to baseband. In this case, the IF filter 6 is provided with a low-pass filter characteristic 68 having a cut-off frequency (fc) that is selected to encompass signal components of the target channel 64, while other components of the IF signal 28 are strongly attenuated. This operation yields the cumulative response shown in FIG. 3c, in which signal components of the target channel 64 have been isolated from the IF signal 28, and can be output from the transceiver 2 as a baseband received signal 36. This received signal 36 can then be passed to further conventional signal processing circuitry (not shown), for clock and data recovery in a manner known in the art.

FIGS. 3d and 3e illustrate operation of the transceiver 2, when heterodyne carrier detection is used. In this case, the LO 14 is tuned to maintain a selected difference between the LO signal frequency and the channel frequency of the target channel 64. As a result, signal components of the IF signal 28 corresponding to the target channel 64 will be centered about an intermediate frequency 66b given by the selected frequency difference. In this case, the IF filter 6 can be provided with a band-pass filter characteristic 70 having a desired (fixed) pass-band center frequency that corresponds with the IF 66b, and a bandwidth 72 that is selected to encompass signal components of the target channel 64. This operation yields the cumulative response shown in FIG. 3e, in which signal components of the target channel 64 have been isolated from the IF signal 28, and can be output from the transceiver 2 as a received signal 36. This received signal 36 can then be passed to conventional signal processing circuitry (not shown), for clock and data recovery in a manner known in the art.

As may be appreciated, the intermediate frequency 66 can be set to any desired value, based, for example, on the capabilities of the IF filter 6 and/or other signal processing systems (not shown) located downstream of the IF filter 6. The transceiver 2 can then operate to translate the center wavelength (frequency) of any arbitrary channel 58 of the broadband optical signal 8, as the target channel 64, to the selected intermediate frequency 66 by suitably controlling the wavelength (frequency) of the LO optical signal 22. Any arbitrary bandwidth of the target channel 64 can be accommodated by suitably controlling the filter characteristic of the controllable IF filter 6. For example, in the case of homodyne detection, the cut-off frequency fc can be adjusted to a frequency equivalent to approximately half the desired target channel bandwidth. In the case of heterodyne detection, the width of the filter passband can be adjusted to correspond with the desired target channel bandwidth.

Figure 5:
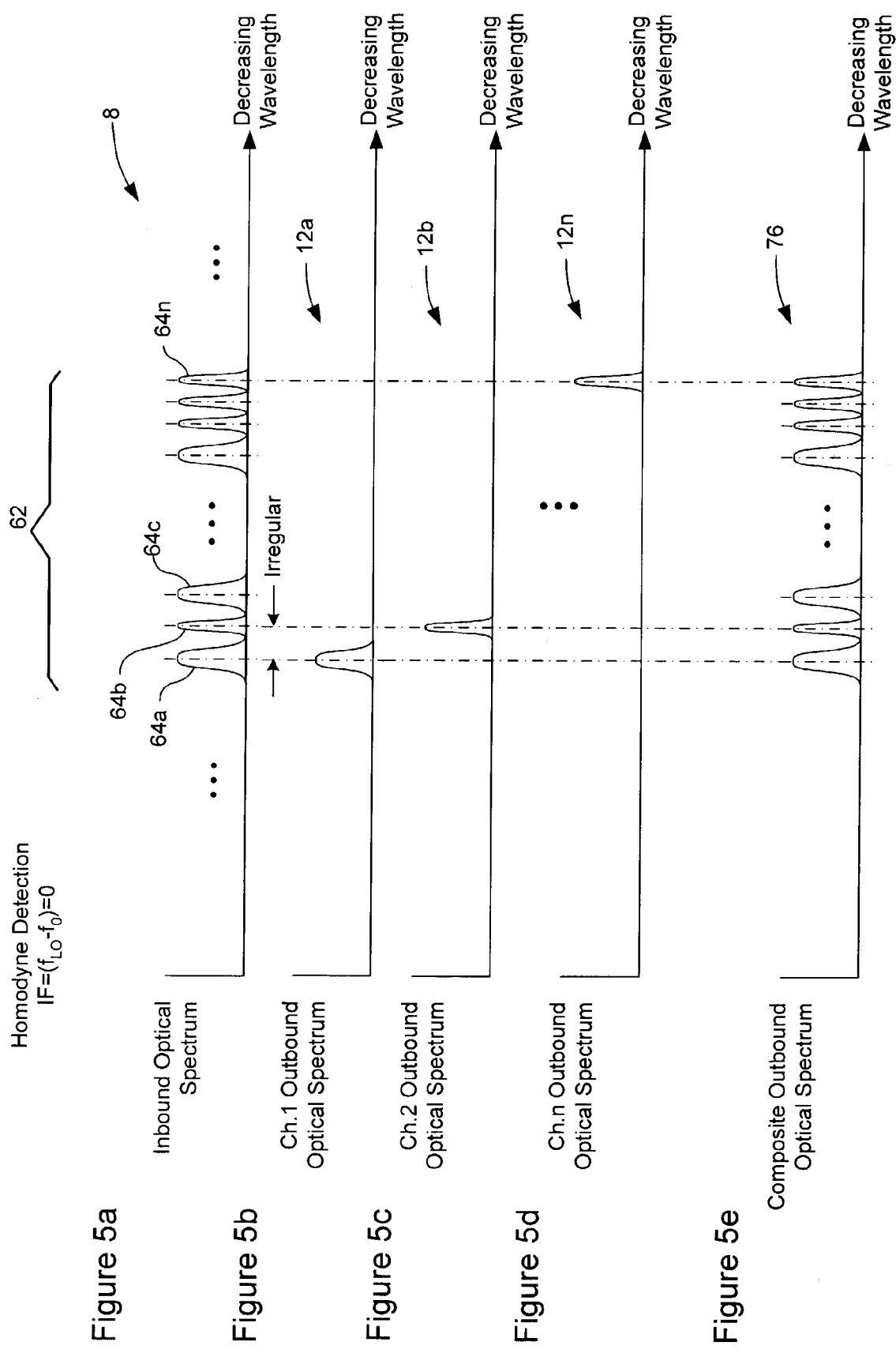
FIGS. 5a–e illustrate transmission operation of the network node of FIG. 4, in which the optical transceivers utilize homodyne carrier detection.
Figure 6:
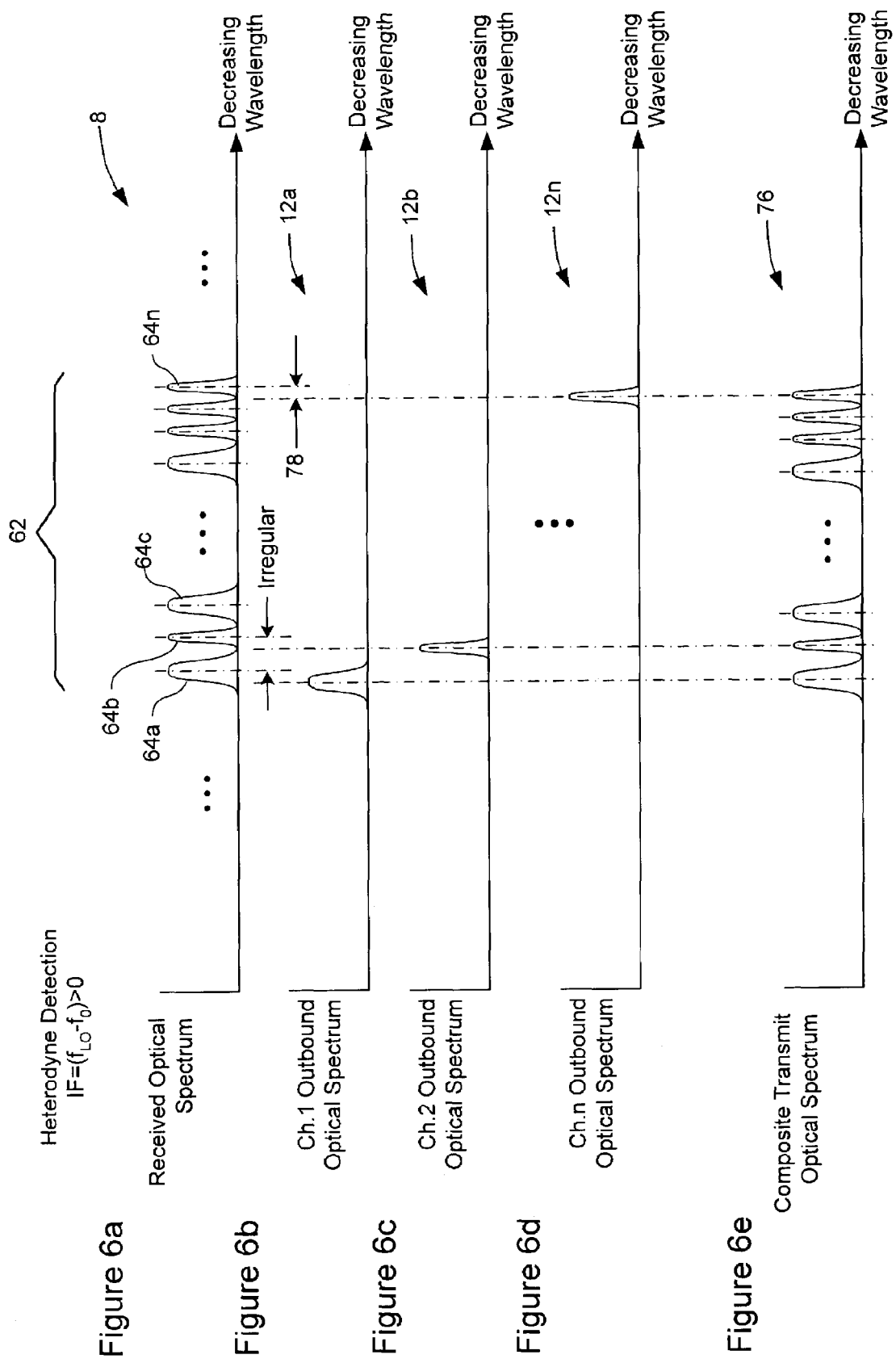
FIGS. 6a–e illustrate transmission operation of the network node of FIG. 4, in which the optical transceivers utilize heterodyne carrier detection.

It will be seen that the Tx LO optical signal 26 serves as the carrier of the outbound optical channel signal 12, for conveying the output signal 50 through the communications network. As will be appreciated, in embodiments in which Homodyne detection is used, the wavelength (frequency) of the outbound optical channel signal 12 will correspond with that of the target channel 64 received by the coherent optical receiver 4 and IF filter 6. On the other hand, in embodiments in which Heterodyne detection is used, an offset will exist between the target and outbound optical channel wavelengths (frequencies). This phenomena will be described in greater detail below with reference to FIGS. 4–6.

Figure 4:
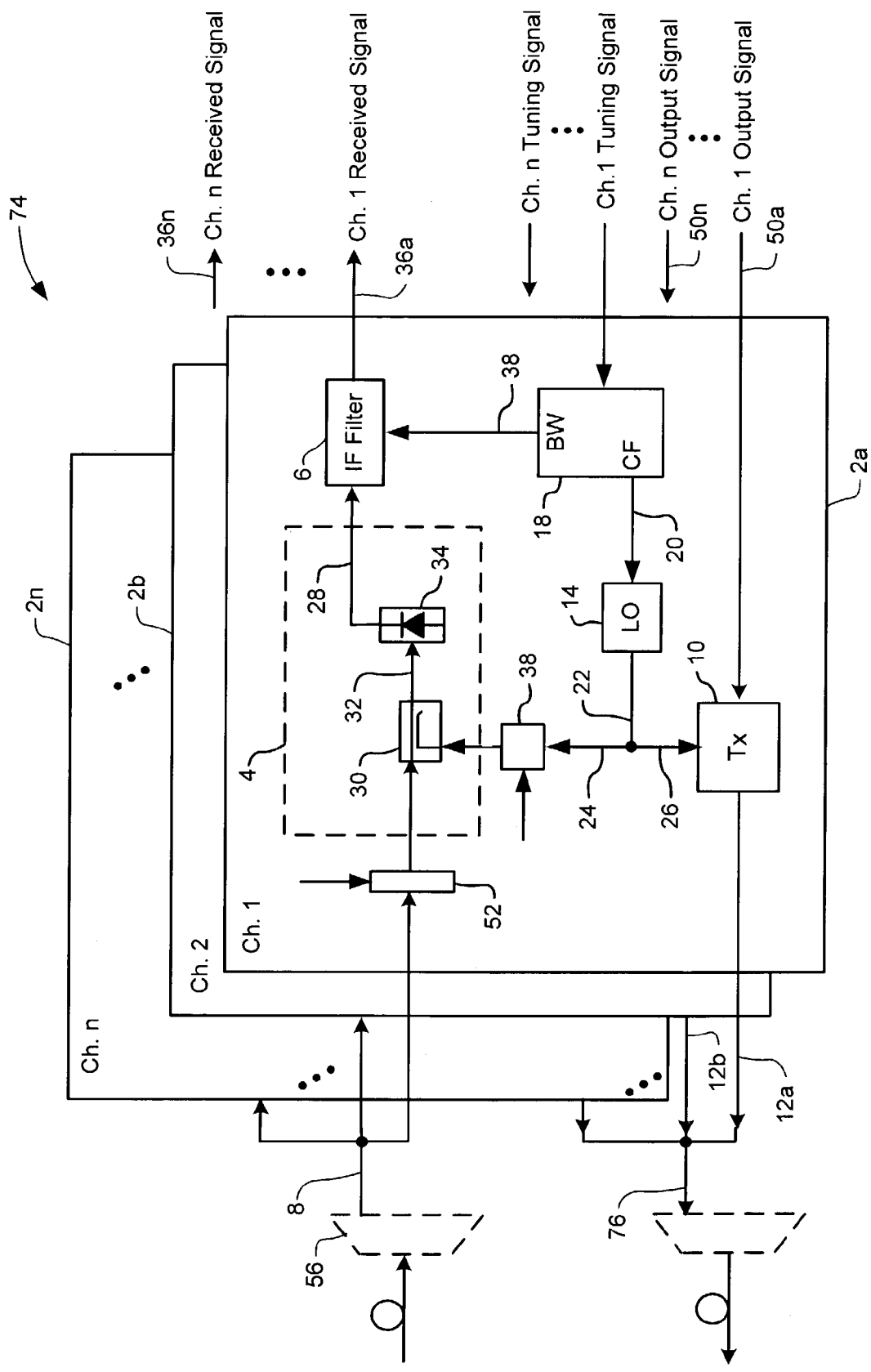
FIG. 4 is a block diagram illustrating a network node incorporating a plurality of optical transceivers in accordance with the embodiment of FIG. 1.

FIG. 4 illustrates a node 74 of an optical network utilizing a plurality of optical transceivers 2a–n of the present invention. Each transceiver 2 receives the inbound broadband optical signal 8 and is tuned to receive a respective different channel 58. Thus, within each transceiver 2, the respective LO 14 is tuned such that a respective target channel 64 is "downconverted" to the predetermined IF 66, passed by the IF filter 6, and emerges from the transceiver 2 as a respective channel received signal 36. Thus the respective LO 14 of each transceiver 2 will be tuned to an LO wavelength (frequency) that is unique, at least across the transceivers 2a–2n that are receiving the inbound broadband optical signal 8.

In embodiments in which homodyne detection is used, the LO signal wavelength (frequency) will correspond with the channel wavelength (frequency) of the respective target channel 64. Because the LO optical signal 22 is also used by the transmitter 10 to generate a respective outbound optical channel signal 12, it follows that the outbound channel wavelength will correspond with that of the respective target channel 64, as may be seen in FIGS. 5a–5d. As shown in FIG. 5e, the outbound channel signals 12 from all of the transceivers 2 can then be combined (in a conventional manner) to generate a composite broadband optical signal 76 having the same format as that of the received broadband optical signal 8. Thus it will be appreciated that the node 74 can be readily inserted into existing optical communications networks, without requiring modification or replacement of neighboring network equipment. Furthermore, individual optical transceivers 2 of the present invention can be inserted into existing network equipment, without requiring modification or replacement of either neighboring (e.g. conventional) transceivers within the same node, or neighboring network equipment within the network as a whole. These characteristics provide a convenient migration path for network providers to upgrade their network equipment.

In embodiments in which heterodyne detection is used, there will be a predetermined difference between the frequencies of the LO signal 22 and the target channel 64. Because the LO optical signal 22 is also used by the transmitter 10, the transmit channel wavelength will necessarily be shifted from that of the received target channel 64 by an offset 78, as may be seen in FIGS. 6a–6d. However, because the offset 78 is substantially equal for all channels, the respective outbound channel signals 12 from all of the transceivers can still be combined (in a conventional manner) to generate a composite broadband optical signal 76 having the same general format as that of the received broadband optical signal 8 (as shown in FIG. 6e). In this case, however, the composite broadband optical signal 76 will be frequency-shifted relative to the inbound broadband optical signal 8. The fact that the inbound target and outbound channel wavelengths are different necessarily implies that neighboring network equipment (e.g. a downstream node receiving the composite broadband optical signal 76) must also be designed to accommodate the differing channel wavelengths. This problem is simplified by recognizing that the inbound and outbound signals 8 and 76 are conveyed through different optical fibers. In addition, the partitioning of the broadband signals 8 and 76 into channel groups 62 provides some tolerance to the presence of a frequency offset 78 between inbound and outbound channels. However, even with these simplifications, insertion of the node 74 into existing optical communications networks may require adjustment or replacement of neighboring network equipment. For this reason, embodiments of the present invention utilizing homodyne detection, as illustrated in FIGS. 3a–c and 5, are preferred over embodiments utilizing heterodyne detection.

Figure 7:
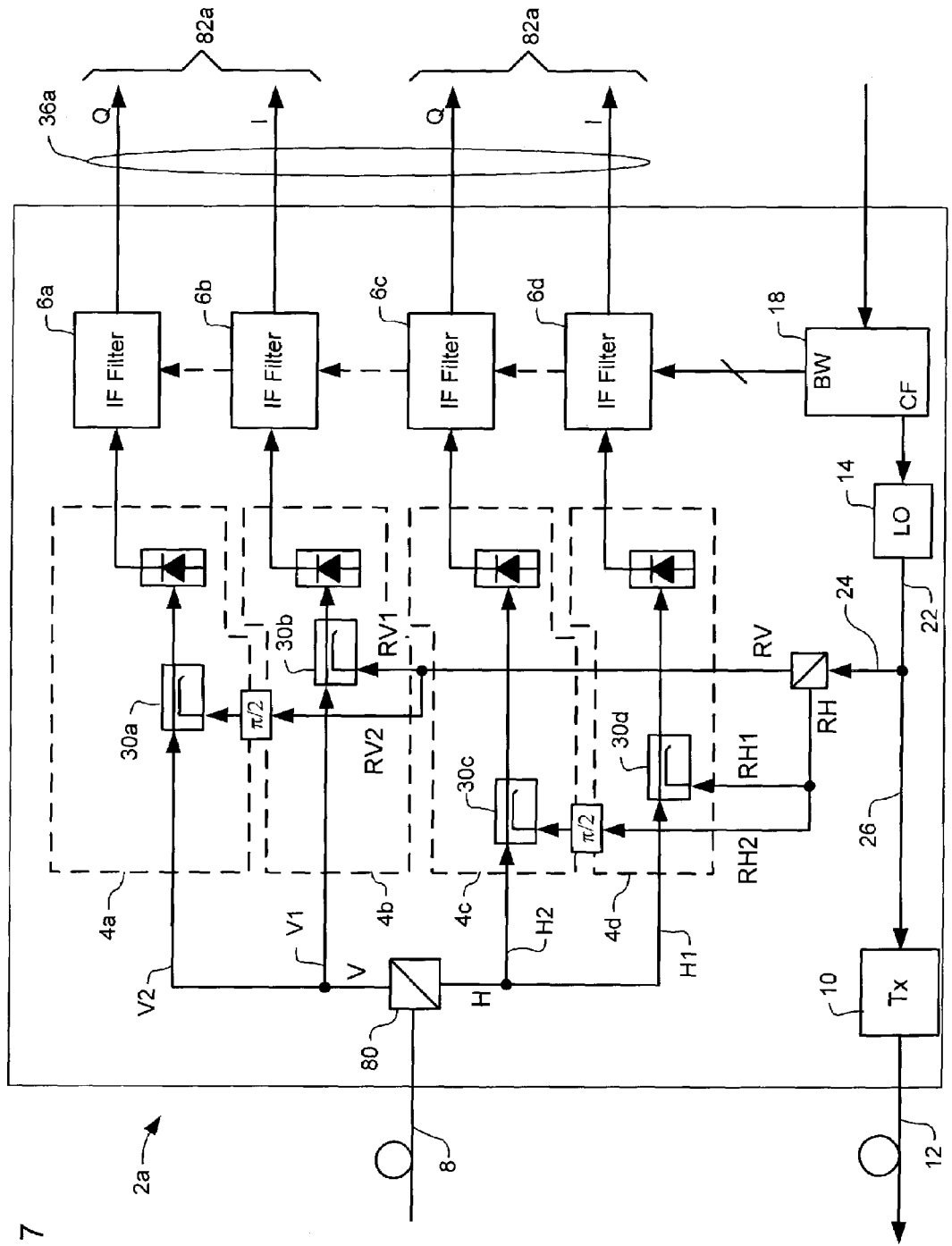
FIG. 7 is a block diagram schematically illustrating principal elements of a frequency agile optical receiver in accordance with a second embodiment of the present invention.

As mentioned previously, in order to successfully detect and isolate the desired target channel 64 within the inbound broadband optical signal 8, it is necessary to ensure that the LO optical signal 22 and the inbound broadband optical signal 8 are both phase and polarization aligned within the optical coupler 30. In the embodiment of FIG. 1, alignment of polarization states is provided by means of a controllable polarization rotator 52 arranged to control the polarization state of the inbound broadband optical signal 8. Phase alignment can be ensured by means of a controllable phase shifter 54. The use of a single optical detector 34 means that the receiver 4 of FIG. 1 is suitable for receiving On-Off Keying (OOK), Binary Phase shift Keying (BPSK) or Differential Phase shift Keying (DPSK) encoded optical signal traffic. However, the receiver 4 of FIG. 1 will be largely insensitive to polarization dependent content of the inbound broadband optical signal 8. Thus, for example, the recieved signal 36 generated by the IF filter 6 of FIG. 1 will not permit accurate data recovery of traffic encoded within the target channel 64 using polarization multiplexing, polarization interleaving or quadrature modulation schemes. FIG. 7 is a block diagram showing an enhanced frequency agile transceiver 2a which overcomes these limitations.

As shown in FIG. 7, the frequency agile transceiver 2a operates by separating the inbound broadband optical signal 8 into orthogonal polarization modes, each of which is sub-divided into a respective pair of components. Each component is then supplied to a respective coherent optical receiver 4 and IF filter 6 closely similar to that of the embodiment of FIG. 1. Thus the transceiver 2a includes a polarization beam splitter 80 for separating the inbound broadband optical signal 8 into orthogonal polarization modes, denoted by H and V in FIG. 7. This step has an additional benefit in that it fixes the polarization state of the H and V polarization modes, so that a dynamic polarization controller 52 (FIG. 1) is not required. If desired, however, a polarization controller can be used upstream of the polarization beam splitter 80, in order to align the polarization of the inbound broadband optical signal 8 to a principal axis of the polarization beam splitter 80. Each of the H and V polarization modes is divided into a pair of signal components H1,H2 and V1,V2, each of which is supplied to a respective coherent optical receiver 4.

Similarly, the Rx LO optical signal 24 is divided into orthogonal polarization modes, denoted by RH and RV in FIG. 7. Each of the RH and RV polarization modes is divided into a pair of signal components RH1,RH2 and RV1,RV2, each of which is supplied to the optical coupler 30 of a respective coherent optical receiver 4.

Each coherent optical receiver 4 and IF filter 6 combination is configured to operate as described above with respect to the embodiment of FIG. 1. The only difference in this case is that one signal component of each polarization mode of the inbound broadband optical signal 8 (in this case, components H1 and V1) is combined with corresponding components of the Rx LO optical signal 24 (i.e. RH1 and RV1), as described above with respect to FIG. 1, while the other signal component of the inbound broadband optical signal 8 (H2 and V2) is combined with a 90° phase delayed version of the Rx LO optical signal 24 (i.e. RH2 and RV2). This enables effective carrier detection of the target channel 64, independently of the phase relationship between the inbound broadband optical signal 8 and the LO optical signal 22.

As may be seen in FIG. 7, the transceiver 2a generates a received signal 36a in the form of a respective pair of received signal components 82 for each polarization mode H, V. Each signal pair 82 provides orthogonal (e.g., quadrature) components of the respective polarization mode H and V, and therefore provides sufficient information for the reconstruction of the respective polarization mode H and V of the target channel 64. Taken together, the two received signal pairs 82 contain sufficient information for complete reconstruction of the target channel 64 of the inbound broadband optical signal 8, including amplitude, phase, and polarization dependent content. Thus the embodiment of FIG. 7 provides a universal optical transceiver 2a capable of detecting and isolating traffic of any arbitrary channel 58 of an inbound broadband optical signal 8, independently of the modulation or multiplexing scheme used to encode the traffic within the target channel 64. As in the embodiment of FIG. 1, the received signal 36a can be forwarded to a signal processor (not shown) for clock and data recovery and/or other system analysis or management functions, in a manner well known in the art.

Figure 8:
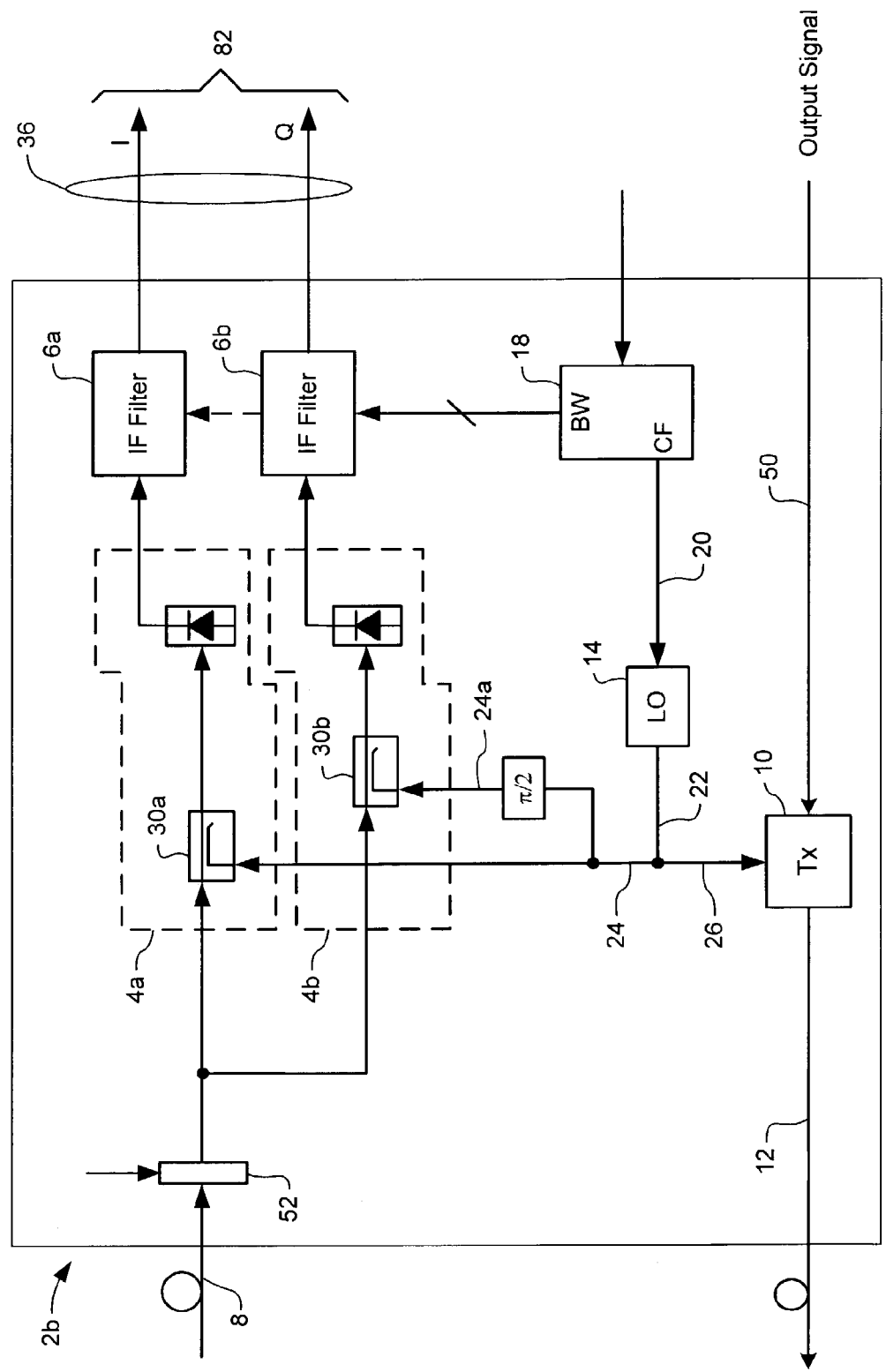
FIG. 8 is a block diagram schematically illustrating principal elements of a frequency agile optical receiver in accordance with a third embodiment of the present invention.

As mentioned above, the embodiment of FIG. 7 provides a universal optical transceiver 2a capable of detecting and isolating traffic of any arbitrary channel 58 of an inbound broadband optical signal 8, independently of the polarization and phase of the inbound optical signal 8, and independently of the modulation or multiplexing scheme used to encode traffic within the target channel 64. In many conventional networks, however, optical signals are transmitted with linear polarization, conventional chromatic multiplexing is used, and traffic is encoded using quadrature modulation. In this case, a simplified version of the transceiver 2a of FIG. 7 can be used, as shown in FIG. 8. The simplified transceiver 2b of FIG. 8 is similar to the universal transceiver 2a of FIG. 7, in that the inbound broadband optical signal 8 is divided into a pair of components, each of which is supplied to a respective optical receiver 4 and IF filter 6. One of the components is combined with the Rx LO optical signal 24 (as described above with respect to FIG. 1), while the other signal component is combined with a 90° phase delayed version of the Rx LO optical signal 24a. As in the embodiment of FIG. 7, this arrangement enables effective carrier detection independently of the phase relationship between the inbound broadband optical signal 8 and the LO optical signal 22. However, because the inbound broadband optical signal 8 was launched with a linear polarization, only one pair of optical receivers 4 and IF filters 6 are required. In addition, the polarization beam splitter 80 of FIG. 7 can be eliminated, in favor of a polarization controller 52, which operates to align the polarization of the inbound broadband optical signal 8 with the Rx LO optical signals 24, and 24a.

It should be noted that because the received signal produced by the coherent optical receiver 4 and IF filter contains sufficient information for complete reconstruction of signal components within the IF signal 28, conventional digital signal processing techniques can be used to accomplish effective data recovery, even in the presence of moderate phase noise in the LO optical signal 22 and/or the inbound broadband optical signal 8. In embodiments in which homodyne detection is used, expensive microwave phase-lock-loops are not required to accomplish this operation. Additionally, because the receiver 4 and IF filter 6 of the present invention is capable of down-converting and isolating traffic of any arbitrary channel 58 of the inbound broadband optical signal 8, changes in the channel plan of the optical communications network can be accommodated without changing any of the receiver hardware. In some cases, deployment of the frequency agile transceiver 2 of the present invention may also allow network nodes to be provisioned with a smaller number of transceivers, because it is no longer necessary to provide a separate transceiver for each wavelength channel of the network.

As will be appreciated, the received signal 36 generated by the IF filter 6 will contain subscriber data conveyed through the optical communications system, as well as noise. Various known signal processing techniques can be used to recover the subscriber data from the received signal 36. Such signal processing may, for example, include equalization, data detection and forward error correction. As is known in the art, each of these processing techniques yield information (such as Bit Error Rate, eye opening, signal power etc.) which may be used to derive a tuning signal for controlling the local oscillator 14. In accordance with the present invention, this functionality is extended to enable control of the local oscillators at opposite ends of a two-way communications link. This operation is described below with reference to FIG. 9.

Figure 9:
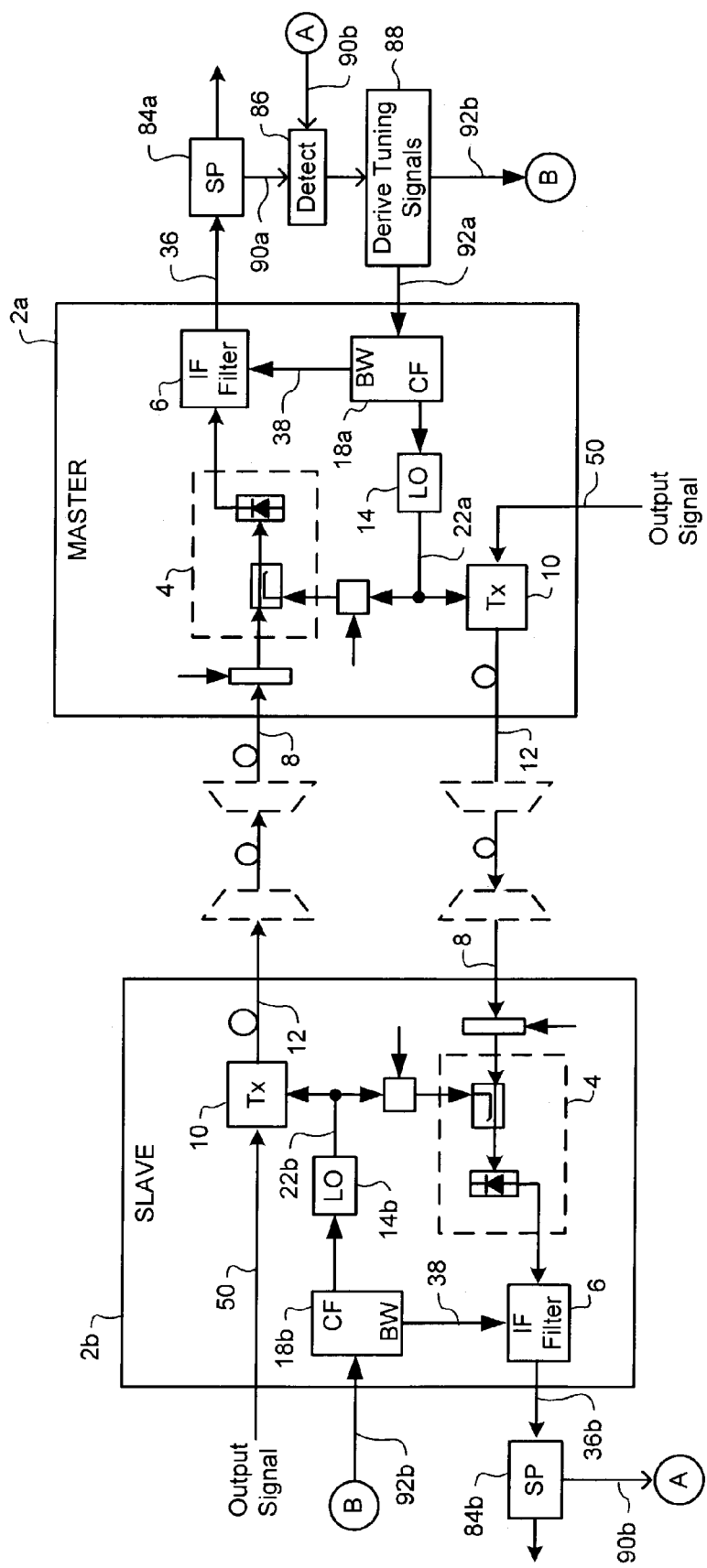
FIG. 9 is a block diagram schematically illustrating principal operations of a feedback control loop for tuning the respective local oscillators at opposite ends of a two-way optical communications system.

As shown in FIG. 9, a two-way optical communications system comprises a pair of transceivers 2 at opposite ends of an optical link. One of the transceivers 2a is nominally designated as a "master", while the other transceiver 2b is designated as a slave. Both transceivers are provided with a conventional signal processor 84 which operates to extract the subscriber data from the received signal 36. Signal quality information (e.g. Bit Error Rate, eye opening, signal power etc.) for both transceivers 2a and 2b is then detected (at 86) and used (at 88) to derive tuning signals for both transceivers 2.

Thus, for example, at the master transceiver 2a, signal quality information 90a obtained by the local signal processor 84a can be detected (at 86) and supplied to a processor 88. Corresponding signal quality information 90b obtained by the signal processor 84b at the "slave" transceiver 2b is transmitted to the master transceiver 2a (e.g. using control channel signaling), detected (at 86) and supplied to a processor 88. Based on the two sets of signal quality information 90a and 90b, the processor 88 can then derive respective tuning signals 92 for the master and slave transceivers 2a and 2b. In particular, the "master" tuning signal 92a can be derived to set a desired frequency of the "master" LO signal 22a; while the "slave" tuning signal 92b is derived to define a desired frequency difference between the master and slave LO signals 22a and 22b. Deriving both tuning signals 92a and 92b at a signal processor 88 has an advantage that it enables joint optimization of the performance of both the master and slave transceivers 2a and 2b. In the case of homodyne detection, the slave tuning signal 92b would be derived so that the frequency difference approaches zero Hz. Alternatively, for heterodyne detection, the slave tuning signal 92b would be derived so that the frequency difference approaches the desired frequency offset 78 between the LO frequency and the inbound optical signal 8. In either case, the algorithm implemented to derive the master and slave tuning signals 92 must account for the propagation delays involved in conveying first the slave signal quality information 90b to the master transceiver 2a, and then transmitting the slave tuning signal 92b back to the slave transceiver 2b. Various methods of accomplishing this (such as by imposing delays on the master signal quality information 90a and the master tuning signal 92a) will be readily apparent to those of ordinary skill in the art, and thus will not be described in greater detail.

The embodiment(s) of the invention described above is (are) intended to be exemplary only. The scope of the invention is therefore intended to be limited solely by the scope of the appended claims.

We claim:

1. A frequency-agile optical transceiver comprising:
   a local oscillator (LO) for generating a respective LO optical signal having a predetermined LO wavelength;
   a coherent optical receiver operatively coupled to the LO, for generating an Intermediate Frequency (IF) signal containing traffic of a target channel of an inbound broadband optical signal, based on the LO optical signal;
   a controllable IF filter for selectively isolating signal components of the target channel within the IF signal; and
   an optical transmitter operatively coupled to the LO for generating an outbound optical channel signal having a respective outbound channel wavelength corresponding to the LO wavelength;
   wherein the LO is responsive to a tuning signal received from a second transceiver to maintain a predetermined frequency difference between the LO optical signal and a respective local oscillator of the second transceiver.

2. A transceiver as claimed in claim 1, wherein the local oscillator comprises a tunable narrow-band laser.

3. A transceiver as claimed in claim 1, wherein the coherent optical receiver comprises:
   an optical coupler for combining the LO optical signal with the inbound broadband optical signal to generate a combined lightwave; and
   a photodetector for detecting the combined lightwave and generating the Intermediate Frequency (IF) signal.

4. A transceiver as claimed in claim 1, wherein the controllable IF filter comprises:
   an analog to digital converter (ADC) for sampling the IF signal at a predetermined sample rate, and for generating a corresponding digital IF signal; and
   a digital filter for filtering the digital IF signal in accordance with a selected filter function.

5. A transceiver as claimed in claim 4, wherein the predetermined sample rate of the ADC is selected to satisfy the Nyquist criterion for signal components of the target channel within the IF signal.

6. A transceiver as claimed in claim 4, wherein the digital filter comprises any one of:
   an Infinite Impulse Response (HR) filter;
   a Finite Impulse Response (FIR) filter; and
   a Fast Fourier Transform (FFT) filter.

7. A transceiver as claimed in claim 4, further comprising a controller for controlling the filter function to adjust at least a passband width of the digital filter.

8. A transceiver as claimed in claim 1, wherein the controllable IF filter comprises:
   a set of two or more filter blocks, each filter block having a respective predetermined filter characteristic; and
   a switch for selectively supplying the IF signal to one of the filter blocks.

9. A transceiver as claimed in claim 8, wherein the switch is responsive to a switch control signal from a controller, to dynamically supply the IF signal to a selected filter block.

10. A transceiver as claimed in claim 3, wherein the coherent optical receiver performs homodyne carrier detection, and the controllable filter comprises a controllable low-pass filter having a selected cut-off frequency.

11. A transceiver as claimed in claim 10, wherein the controllable low-pass filter is responsive to a filter control signal to selectively control the cut-off frequency in accordance with a bandwidth of the target channel.

12. A transceiver as claimed in claim 3, wherein the coherent optical receiver performs heterodyne carrier detection, and the controllable filter comprises a controllable band-pass filter responsive to a filter control signal to selectively control the pass-bandwidth in accordance with a bandwidth of the target channel.

13. A transceiver as claimed in claim 1, wherein the transmitter comprises an optical modulator for modulating the LO optical signal in accordance an output signal to generate the outbound optical channel signal.

14. A transceiver as claimed in claim 1, further comprising:
   means for detecting at least one signal parameter of the target channel;
   a processor for deriving first and second tuning signals based on the detected signal parameters; and
   means for sending at least one of first and second tuning signals to the second transceiver.

15. A transceiver as claimed in claim 14, wherein the means for detecting at least one signal parameter comprises a signal processor for processing the isolated signal components of the target channel, and for generating at least one parameter indicative of a quality of the target channel.

16. A transceiver as claimed in claim 14, wherein the signal parameter comprises any one or more of:
   signal power;
   bit error rate; and
   eye opening.

17. A transceiver as claimed in claim 1, wherein the transceiver is coupled to the second transceiver via a bi-directional optical link.

* * * * *